United States Patent [19]

Drcsak

[11] 3,711,966
[45] Jan. 23, 1973

[54] GEOGRAPHICAL GAME

[76] Inventor: Frank Drcsak, 5440 Harold Way, Apt. No. 8, Los Angeles, Calif. 90027

[22] Filed: Sept. 1, 1970

[21] Appl. No.: 68,619

[52] U.S. Cl. ................................35/40, 273/130 G
[51] Int. Cl. ..............................................A63f 3/04
[58] Field of Search ..........35/40, 41, 42; 273/130 R, 273/130 G, 131 BB, 134 AC, 135 AB

[56] References Cited

UNITED STATES PATENTS

| | | | |
|---|---|---|---|
| 387,220 | 8/1888 | Forker | 273/130 G |
| 635,596 | 10/1899 | Herman | 35/40 X |
| 1,179,076 | 4/1916 | Cruver | 273/130 G |
| 1,539,773 | 5/1925 | Roth | 273/131 BB X |
| 2,199,499 | 5/1940 | Kreitler | 35/42 |
| 2,674,813 | 4/1954 | Hutchinson | 35/41 |
| 3,086,298 | 4/1963 | Hamlin | 35/41 |

FOREIGN PATENTS OR APPLICATIONS

| | | | |
|---|---|---|---|
| 399,442 | 8/1924 | Germany | 273/135 AB |
| 170,231 | 10/1921 | Great Britain | 35/42 |
| 202,007 | 8/1923 | Great Britain | 35/40 |

*Primary Examiner*—Harland S. Skogquist
*Attorney*—Harry Kotlar and Lewis B. Sternfels

[57] ABSTRACT

The disclosed embodiment of the game comprises a board having outlines of the United States and the 50 States and a plurality of state pieces which are placeable in the state outlines. At the state capital of each piece is a hole for insertion therein during play of the flag of that state. Prior to play all the flags are mounted in a frame and on the frame are 50 tongues, one for each state. On one side of the tongue is the name of the state while on the other side of the tongue is the name of the capital of the state.

2 Claims, 7 Drawing Figures

PATENTED JAN 23 1973
3,711,966
SHEET 3 OF 3
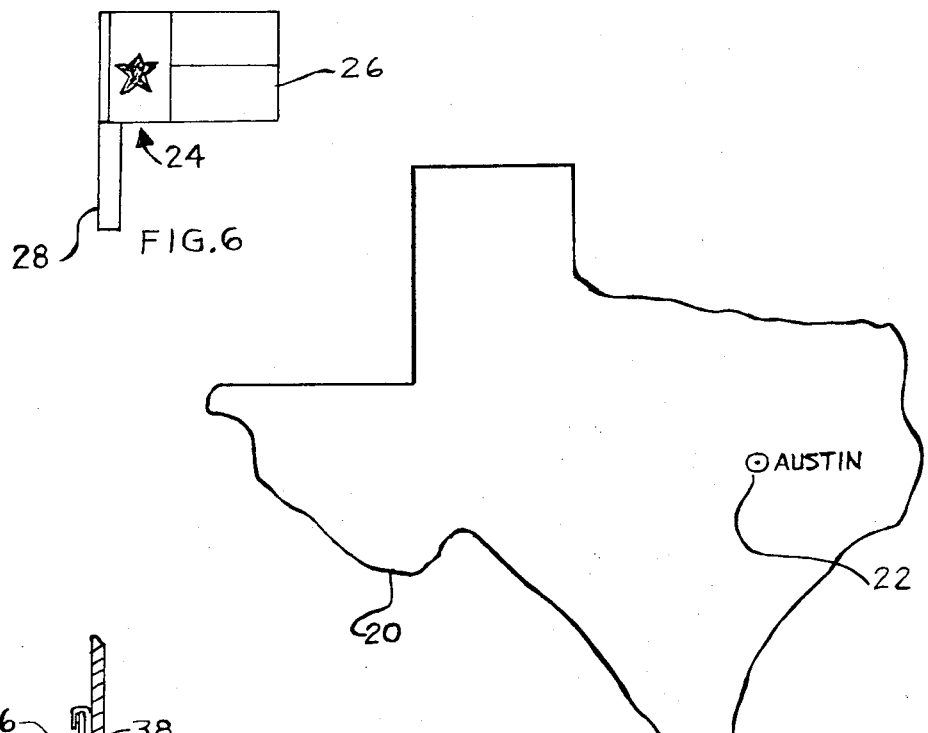
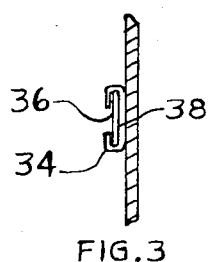
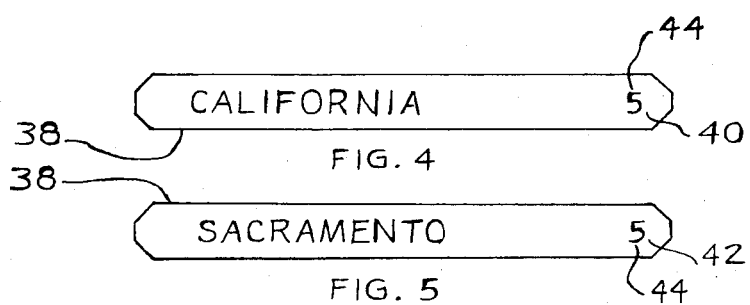

GEOGRAPHICAL GAME

The present invention relates to a game and, more particularly, a game utilized as a teaching aid.

In order to instruct people, especially children, it is necessary that their attention be held. Such instruction is most efficiently effected when their interest can be maintained as opposed to learning by rote. There have been many ways in which this aim has been accomplished and the present invention is directed to a very simple manner of instructing people through the medium of playing a game. In its particular embodiment, the present invention is directed toward learning the states of the United States, their location, their state capitals, their state flags, flowers, admission to the Union, etc. This embodiment, for learning about the United States, is of particular importance in order to instill interest and pride in the player, especially a child, for his country so that he will have respect for the traditions and heritage of his country, as well as knowledge of its history and physical and geographic characteristics. It is to be understood, of course, that instruction as to countries of the world and even planets of the solar system may be used instead of the United States and the several states.

In the present invention, the learning process is illustratively embodied for the United States and this embodiment utilizes a board on which the outlines of the United States and the several states are placed. Each state is configured as a piece which is to be placed during play of the game in its particular state outline on the board. The capital of the state is noted by an opening therein. A plurality of flags supported on staffs are the state flags and one object of the game is to have these flags positioned in the state by means of the staff inserted in the opening in the state. On the back of the flag may be information relating to the state such as when it was admitted to the Union, its order of admission, its state flower, motto, certain geographic, manufacturing, farming, etc., information, and the like. Further elements comprising tongues have the state name printed on one side and the state capital printed on the other side. Both the flags and the tongues are placed in a special frame prior to play and each state flag has a number which corresponds to a number of the tongue in order to aid in location and correspondence of the flags or tongues. Instructions for playing the game are placeable on a slide which may be slid in and out of the board. In addition, a score sheet may be placed on another slide which is also slideable into and from the board. Therefore, when the game is not played, the instruction and score card slides are slid into the board and, conversely, when the game is played, the slides are slid out from the board.

In order to play the game, all the flags and tongues are placed in the frames and all the state pieces are placed in random manner to one side of the board outline of the United States. Although one person may play the game, more interest is generated when there are several players. One player begins the game and he is designated as the leader. The leader may be selected by choice, by roll of dice, or he may be the winner of a preceding game. The leader selects a particular tongue and states either the state name or the state capital, requesting the player to his left to state the other of the capital or the state which the leader names. The second player then selects the flag of that state or state capital named by the leader and further selects the state piece corresponding to that state or capital named by the leader. This state piece is then placed in its proper position on the board outline and the flag staff is inserted in the opening provided in the piece. For each correct answer or correct placement of a piece, the second player gains a point. For each wrong answer, he obtains no points but is told what the correct answer is so that he may learn that piece of information. Further information on the back of the flag may be asked for which extra points are given for the correct answer. The second player then proceeds as a leader with the player to his left and the game continues until all pieces are placed on the map. The points of each player are then totalled and the player with the highest total wins the game.

It is, therefore, an object of the present invention to provide a game.

Another object is the provision of a teaching aid.

Other aims and objects as well as a more complete understanding of the present invention will appear from the following explanation of exemplary embodiments and the accompanying drawings thereof, in which:

FIG. 3 is a partial section of the board taken along lines 3—3 of FIG. 2;

FIGS. 4 and 5 illustrate reverse sides of the tongues placeable on the frame;

FIG. 6 illustrates one of the flags insertable in the frame of FIG. 2; and

FIG. 7 illustrates one state piece placeable in the outline of FIG. 1.

Figure 1:
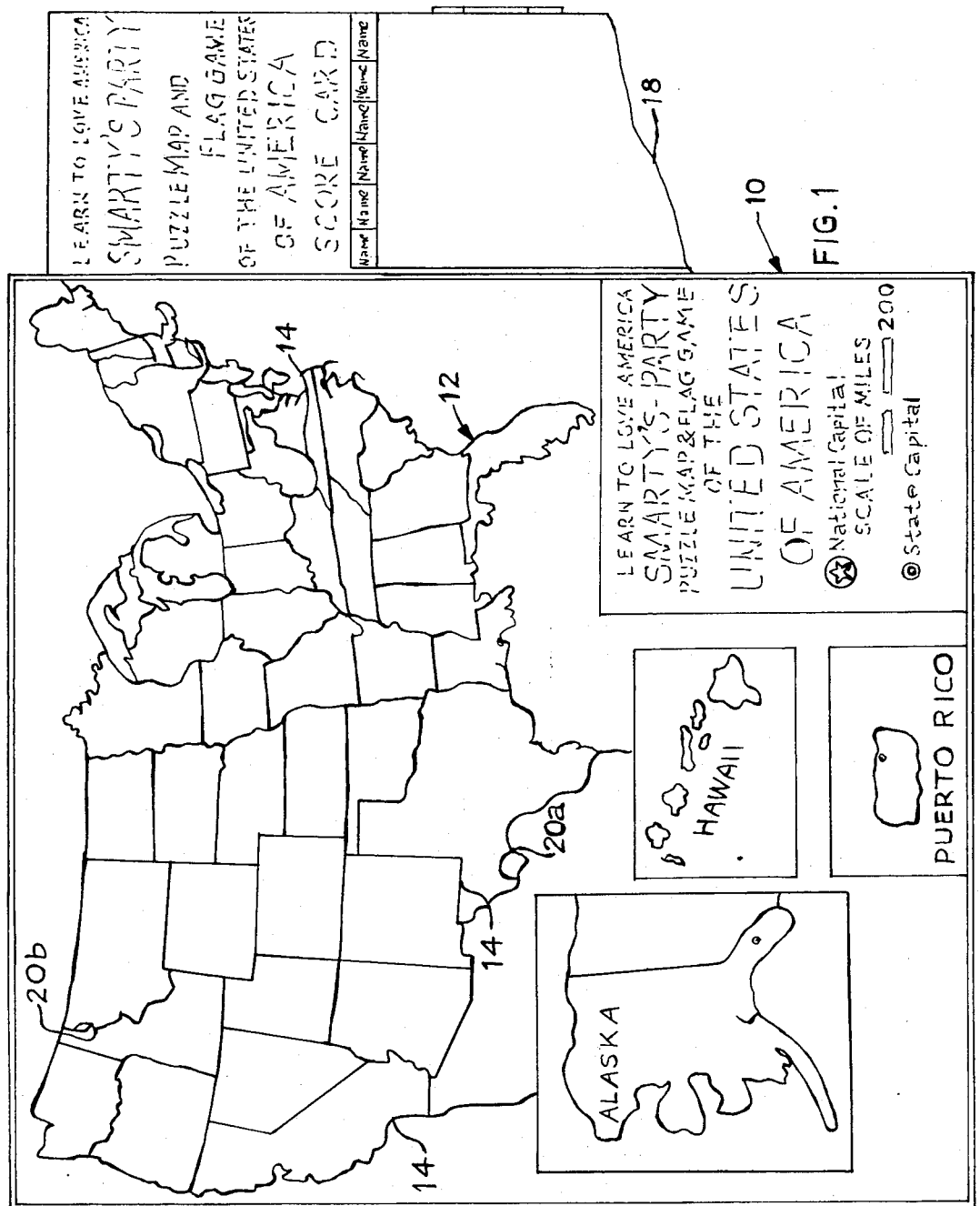
FIG. 1 illustrates a game board with two slides therein for rules of the game and a scorecard.

Accordingly, with reference to FIG. 1, a game board 10 is shown with a map 12 of the United States in outline with the outlines 14 of the several states of the United States. Slidably received in the board are slides 16 and 18, slide 16 having the rules of the game thereon and slide 18 having a scorecard for the several players of the game. Placeable within the board are a plurality of pieces representing each state and which are sized to correspond with the state outline 14 of the map. Such a state piece is shown in FIG. 7 as piece 20 representing the state of Texas. Piece 20 is placeable in state outline 20a of FIG. 1. At the state capital, Austin, of Texas state piece 20 is an opening 22.

A plurality of state flag elements, one of which is element 24 is shown in FIG. 6, each comprising a flag 26 and a staff 28. Staff 28 is sized so as to be positionable within opening 22 of its corresponding state. As shown, FIG. 6 represents the Texas state flag and, therefore, this flag element 24 is particularly used with Texas state piece 20.

Figure 2:
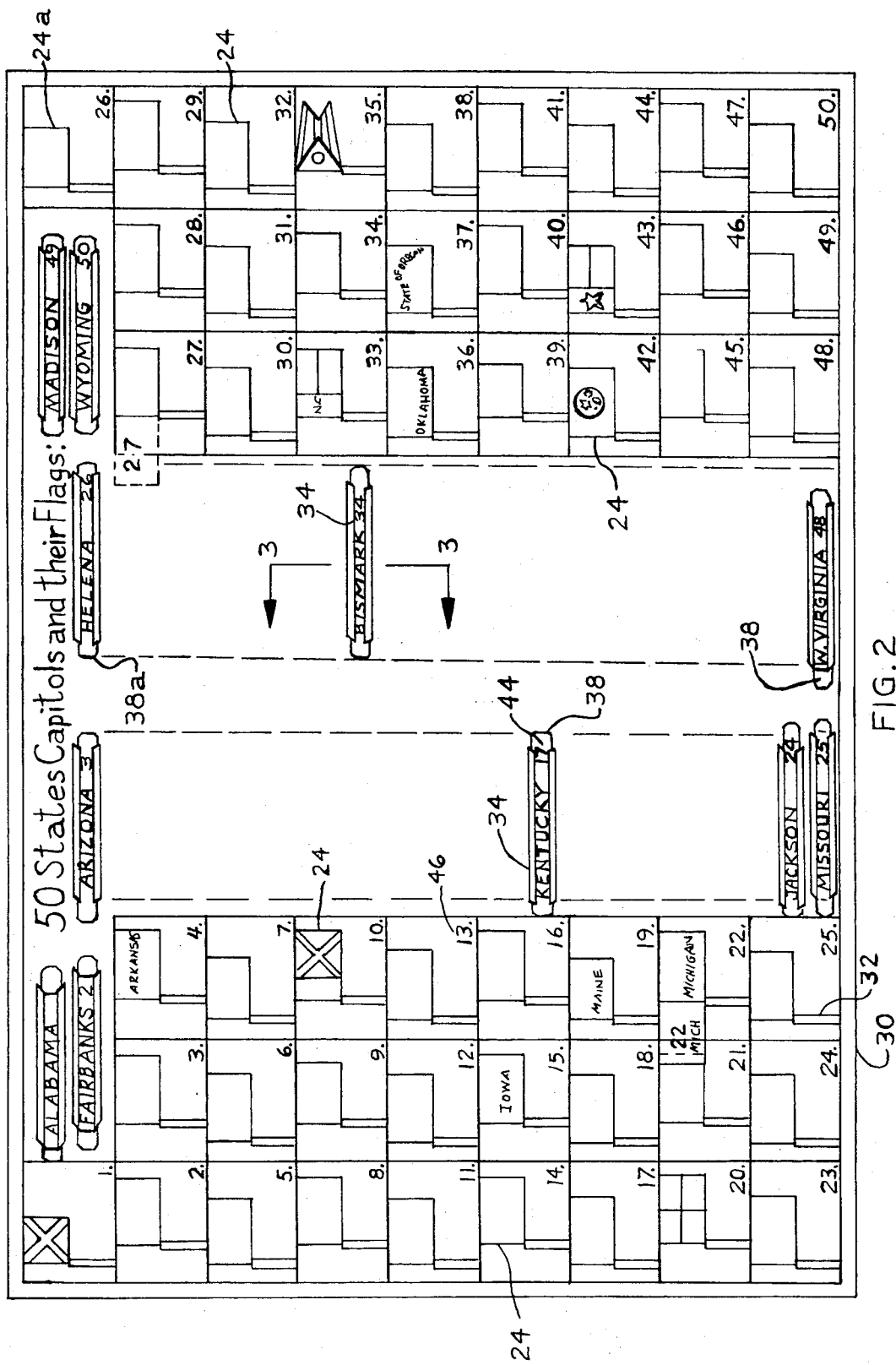
FIG. 2 depicts the frame with state flags and state-state capital tongues thereon.

State flag elements 24 are disposed to be placed within a frame 30 (see FIG. 2) within receptacles 32 thereon. The flags of the states may be positioned alphabetically and may be numbered consecutively 1 through 50. Also on frame 30 is a plurality of holders 34, see also FIG. 3, having slots 36 therein for reception of a plurality of tongues 38, which are also depicted in FIGS. 4 and 5. On one side 40 of each tongue is the state name while on the other side 42 of each tongue is the state capital name. These tongues are placeable alphabetically on frame 30 wherein either the state name or the state capital may be shown outwardly. Each tongue is provided with a numeral 44 which corresponds to its corresponding state numeral 46 in order to aid identification of the respective tongue and flag, in case the flag is not recognized. On the other side of each flag 26 may be provided information regarding the state. Such information may include date of its admission into the Union, various geographic, manufacturing or farming information, and the like.

Prior to playing the game, all flags 24 and tongues 38 are positioned on frame 30. All state pieces 20 are placed in random fashion to one side of map outline 12. The first player selects a tongue 38 at random such as tongue 38a on which is shown the name "HELENA." He asks the player to his left the name of the state of which Helena is the capital. The player may know the answer as Montana and, if so, one point is scored for him on the scorecard contained in slide 18. This player then selects the state piece 20 which is Montana and further selects the flag 24a which is the state flag of Montana. He places the flag in hole 22 of the Montana state piece and then places this piece in its state outline 20b as shown in the map of FIG. 1. For each correct identification of state name, state flag, state piece, and placement in the state outline of United States outline 12, he receives a point which is placed on the scorecard. If he does not know a particular answer for which, of course, he receives no point, he is told the correct answer. For example, he may not know the state flag which relates to the state. He is aided, in the case of Montana, by numeral 26 which is affixed to Montana tongue element 38a. This numeral 26 corresponds to a corresponding numeral 26 on the flag portion of frame 30 so that he may then find state flag 24a.

The player who has been asked the several questions then selects another tongue and queries the player to his left in a similar manner as he was queried and gives points where correct answers are given and provides correct answers when the answers are not known or are incorrect. The game continues until all state pieces have been positioned in outline 12. The player with the maximum number of points wins the game. In replaying the game, piece 38a may be turned around so that the state capital "HELENA" does not appear on the tongue but that the state name "MONTANA" appears. In such a manner, the game may be changed each time it is played in order to further instruct and to provide variety in its playing.

Although the invention has been described with reference to a particular embodiment thereof, it should be realized that various changes and modifications may be made therein without departing from the spirit and scope of the invention.

What is claimed is:

1. A game comprising
  a board having an outline of the United States and a plurality of space means provided with outlines identifying the several states of the United States,
  a plurality of pieces having opening means therein and having outlines configured to conform to the states of the United States, said pieces corresponding in number to the plurality of space means of said board, each said piece positionable in a corresponding one of said board space means,
  a plurality of flags corresponding in number to the number of said state pieces and having staffs positionable in said opening means of said state pieces and having indicia thereon representing the flags of the states of the United States,
  a frame having a plurality of cylindrical receptacles corresponding in number to the number of flags for reception of said flag staffs, said frame further having a plurality of slotted holders, and
  a plurality of tongues corresponding in number to the number of said state pieces, each of said tongues slidable within each of said slotted holders and having a pair of opposed sides, one of said sides having indicia representing the capital name of one of the states and the other of said sides having indicia representing the state name,
  whereby a selection of one of said tongues by one player requires another player to identify one of said indicia on one of said state pieces corresponding to said selected tongue, to identify one of said flags corresponding to said selected tongue and to identify said board space means corresponding to said selected tongue; said identified state piece being positioned in said identified board space means, and said flagstaff of said identified flag being positioned in said opening means of said identified state piece; said other player being scored for each correct identification of said indicia of said tongue side, said corresponding state piece, said corresponding flag, and said corresponding board space means.

2. A game as in claim 1 wherein said flags and said tongues each have numeral indicia thereon, the numeral indicia of each said flag and each said tongue representing the state, state capital or state flag being the same to enable further identification of corresponding state pieces and flags.

* * * * *